Patented Feb. 20, 1951

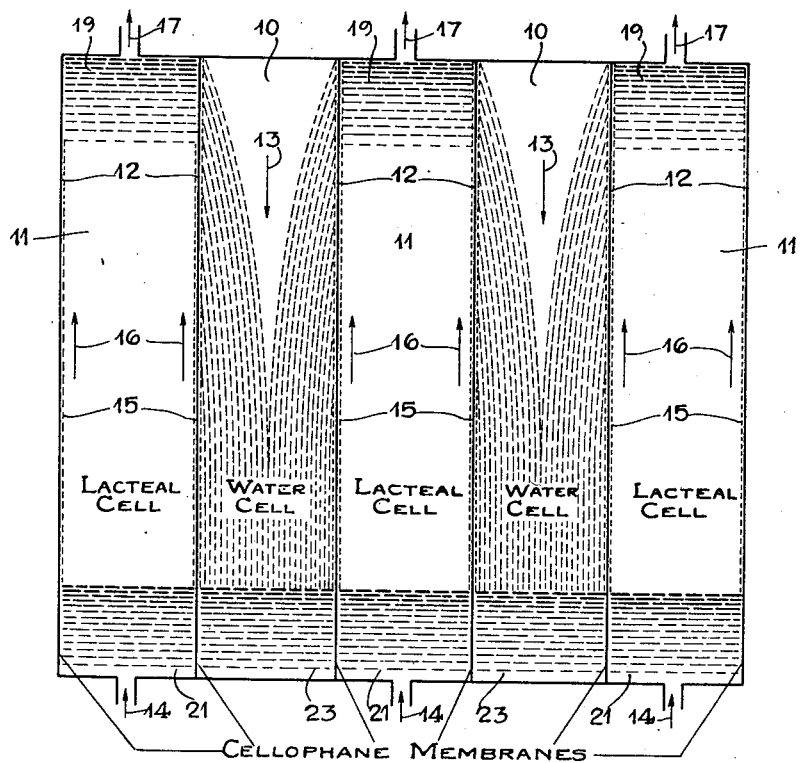

2,542,633

UNITED STATES PATENT OFFICE 2,542,633

MODIFIED MILK PRODUCT

Frederick K. Daniel, Kew Gardens, N. Y., assignor to Sun Chemical Corporation, New York, N. Y., a corporation of Delaware Application July 10, 1947, Serial No. 760,073

6 Claims. (Cl. 99—54)

This application is a continuation in part of applications Serial No. 472,282, filed January 13, 1943, now abandoned, and Serial No. 525,943, filed March 10, 1944, now United States Patent No. 2,437,080, and through said applications, of application Serial No. 429,104, filed January 31, 1942, now abandoned.

This invention relates to dairy products and more particularly to pure dairy products useful in dietetics.

One object of the present invention is to provide a pure dairy product useful in dietetics and comprising a material derived from milk.

Another object of the present invention is to provide a pure dairy product from milk which has a substantially decreased proportion of sodium, potassium and chlorine, and a substantially increased portion of calcium, as compared to the proportion of these materials present in the original milk.

Another object of the present invention is to provide a pure dairy product useful in dietetics which is derived from milk and which is characterized by complete dispersibility in water.

Other objects of the present invention will be apparent from the following description and appended claims.

For many dietetic purposes, milk products containing the constituents as originally present in the milk are unsatisfactory. Such unsatisfactory characteristics are due, in part at least, to the presence in the milk of materials which under certain conditions have an objectionable effect upon the human system. Such objectionable effects are encountered when the human system is unable to handle and dispose of those materials present in milk which have such effect. For example, in the case of people suffering from nephritis, a high protein diet is desirable. When attempts are made to supplp such high protein diet by means of milk, it is found that the desirable effect of the high protein content of the milk is more than overcome by the presence in such milk of an objectionable concentration of sodium. In order to provide sufficient protein and calcium to be useful in diets for nephritic persons by means of milk diets, such a large proportion of sodium is taken into the system as to objectionably affect the patient.

Also in the case of persons suffering from high blood pressure, milk is normally an unsatisfactory dietetic material because of its objectionably high concentration of sodium.

Other cases in which milk would be satisfactory except for its relatively high concentration of such materials, include the treatment of cardiac decompensation, pregnancy and pre- and postoperative care, where a diet relatively free from sodium and high in protein is indicated.

In order to be completely satisfactory in dietary uses, it is essential that any product which is derived from milk retain both its dispersibility in water and its palatability. Hitherto, materials which have been derived from milk in which an attempt has been made to reduce the sodium, potassium and chlorine concentration have resulted in materials which were unsatisfactory, in addition to other defects, by lack of dispersibility in water, or by lack of palatability. The latter is most important psychologically in diets utilized by patients who are suffering from one or other of the above conditions.

I now have found according to the present invention, that a completely satisfactory pure dairy product can be derived from milk, and when such product is prepared to have a particular proportion of ingredients present, that such product is applicable in diets for the above illnesses. Additionally, with the proportions of materials present in the products of the present invention such products are characterized by complete dispersibility in water and by extremely good taste and palatability.

Dispersibility in water is important, since the products of the present invention can be diluted to any desired proportions by simple admixture with water, prior to utilization.

The necessary and essential proportions of materials present in the products of the present invention include a substantially decreased proportion of sodium, potassium and chlorine and a substantially increased proportion of calcium, per unit weight of protein present. When a product is prepared from milk which meets the above essential conditions of the present invention, it has been found that such product is particularly effective in diets intended for persons suffering from nephrosis and other illnesses, such as those above mentioned.

Satisfactorily the products of the present invention can be prepared from skim milk. One particularly satisfactory method of treating such skim milk to provide the milk products of the present invention is set forth in my co-pending application, Serial Number 525,943, filed March 10, 1944, which now has issued as U. S. Patent No. 2,437,080. In such application there is described a dialysis procedure in which the material to be treated is introduced in a continuous stream between cellophane, parchment or similar permeable membranes in a dialysis cell at the bottom thereof and without turbulence. While the body of the material to be treated moves upward in such cell, the layers directly adjacent to the diaphragms move more quickly because of a decrease in specific gravity due to a loss of dissolved salts and reception of water from the adjacent water cell in which water is flowing downwardly.

Illustrative of the procedure set forth in my copending application, Serial Number 525,943, now U. S. Patent No. 2,437,080 is the drawing (Fig. 1) which is a diagrammatic, sectional view of a dialysis cell utilizing the above set forth procedure. In the figure the water cells are indicated at 10 and the cells containing the material to be treated are indicated at 11. The diaphragms 12, may be of cellophane, regenerated cellulose or parchment. The direction of flow in the water cells is downward as indicated by the arrows 13.

The material to be dialyzed is introduced at 14, in such a manner as to obviate the possibility of turbulent flow in the cells 10. Currents of the material being treated are set up within cells 10 by reason of a decrease in specific gravity of the thin layer 15, immediately adjacent to the diaphragm 12. The film 15 of decreased specific gravity flows upwardly, as indicated by arrows 16 and collects in a horizontal layer 20 at the top of cells 11. The material of decreased specific gravity then may be removed as indicated at 17 at the top of cells 11.

The incoming material to be treated passing into cells 11 and 14 forms a layer 21 of increased specific gravity at the bottom, while the treated material 19, as it passes along the membranes 12 is stratified in horizontal 19 at the top of cells 11. In the water cells 10, the diffused material 22 descends downwardly as indicated at 25 along the length of membranes 12, to form the diffusate layers 24 of increased specific gravity. The diffusate is then removed at 24.

An illustrative example of the products of the present invention is given below and compared with the material from which it is derived. It is seen from the analysis of the materials present that the products of the present invention show a greatly decreased amount of sodium, potassium and chlorine as compared to the material from which they are prepared. From examples in the analysis shown, in the product of the present invention the amount of sodium has been decreased by 80.6%, the amount of potassium by 90% and the amount of chlorine by 99.65% all based on a unit weight of protein, as compared to the material from which they are derived. Also the illustrative example indicates that the percentage of calcium is increased by 21.8% as compared to the material from which the products of the present invention are derived in the illustrative example set forth. When considered upon a dry basis, that is, upon the percentage of the individual constituents present in undialyzed skim milk and in dialyzed skim milk per unit weight of the total solids as set forth in the following table, it will be seen that the percentage of protein is increased 54.5% and that the percentage of lactose is decreased 32.94%, resulting in a ratio of protein to lactose in the dialyzed milk which is in approximately the reverse proportions to the proportions of these materials present in the undialyzed milk.

| | Representative Analysis of— | | | | |
|---|---|---|---|---|---|
| | Dialyzed Skim Milk | | Per Cent of Change | Undialyzed Skim Milk | |
| | On dry basis | Per 100 gms. Protein | | On dry basis | Per 100 gms. Protein |
| Protein | 55.00 gms | 100 gms | −0.0 | 35.60 gms | 100 gms. |
| Lactose | 34.00 gms | 61.80 gms | −56.7 | 50.70 gms | 142.50 gms. |
| Fat | .80 gms | 1.45 gms | −42.0 | .90 gms | 2.50 gms. |
| Total Ash | 6.15 gms | 11.20 gms | −52.0 | 8.30 gms | 23.40 gms. |
| Na | .13 gms | .236 gms | −80.6 | .433 gms | 1.22 gms. |
| K | .225 gms | .41 gms | −90.0 | 1.47 gms | 4.13 gms. |
| Cl | .006 gms | .011 gms | −99.65 | 1.13 gms | 3.18 gms. |
| P | 1.15 gms | 2.19 gms | +4.0 | .72 gms | 2.02 gms. |
| Ca | 1.85 gms | 3.36 gms | +21.8 | .98 gms | 2.76 gms. |
| Moisture | 2.80 gms | 5.10 gms | | 2.90 gms | 8.15 gms. |
| Total Wgt | 98.75 gms | 179.55 gms | | 98.40 gms | 276.55 gms. |
| Calories | 372.3 | 676.9 | | 362.2 | 1017.5. |

Such treated products of the present invention are completely dispersible in water and have entirely satisfactory palatibility.

The above example is illustrative. In some instances the particular amounts of ingredients may vary somewhat. For example, a product can be prepared which has present between 50 and 58% protein to give a product of the desired high protein content from milk and in which the actual proportions of sodium, potassium and chlorine, phosphorus and calcium may vary slightly from those set forth above. However, in all instances the products in the present invention have the substantially decreased proportion of sodium, and substantially increased proportions of calcium essential in the present invention.

After completion of an operation such as the dialysis illustratively set forth, the products may soon be treated to evaporate therefrom the liquid constituents to provide the products of the present invention in powder form. It has been found that the well known operation of spray-drying is particularly effective for this purpose. When such spray-dried material is prepared it may be diluted with water before use. For example, where a high protein diet is desirable, 5 ounces of the powdered material of the present invention may be added to 28 ounces of water. This will make a quart of liquid material containing as much protein as 2½ quarts of untreated milk. Such product has a low calory content as compared to an untreated material of like protein content. In case of the material above set forth, the product of the present invention provides 537 calories as compared to 800 calories for untreated milk of the same protein content.

Where a high protein diet is not required the ratio of protein to carbohydrate present in the untreated milk may be restored by the addition of 1.5 ounces of lactose or other carbohydrate to 3.5 ounces of the treated milk of the present invention. Such products then may be added to 28 ounces of water to provide one quart of the material. More or less water may be used according to individual taste and useage.

Also where desired, flavoring agents may be incorporated in the products of the present invention to provide particular flavors.

Included in the materials from which the products of the present invention can be prepared are whole milk, skim milk, and vacuum-concentrated skim milk. In the case of the latter material, the concentration of the solids satisfactorily is 20–36%.

Dialysis operations of the type illustratively described in the present invention should be conducted at reasonably moderate temperatures for most efficient results. For example, it has been found that entirely satisfactory results are secured in practical commercial operations when the temperature of the material being treated and of the water utilized are maintained within the range of 34–50° F.

While the above products and the processes of preparation of these products constitute preferred embodiments of the present invention changes may be made therein without departing from the scope of the invention as defined in the appended claims.

What is claimed is:

1. A pure dairy product useful in dietetics comprising a material derived from milk and having, per unit weight of solids, a substantially decreased proportion of sodium, potassium, lactose and chlorine and a substantially increased proportion of protein and calcium, as compared to the proportion of these materials present in said milk, the ratio of protein to lactose being in approximately reverse proportion to the proportions of these materials present in said milk, said material being charactertized by dispersibility in water.

2. A pure dairy product useful in dietetics comprising a material derived from skim milk and having, per unit weight of solids, a substantially decreased proportion of sodium, potassium, lactose and chlorine and a substantially increased proportion of protein and calcium, as compared to the proportions of these materials present in said milk, the ratio of protein to lactose being in approximately reverse proportion to the proportions of these materials present in said milk, said material being characterized by dispersibility in water.

3. A pure dairy product useful in dietetics comprising a material derived from vacuum concentrated skim milk and having, per unit weight of solids, a substantially decreased proportion of sodium, potassium, lactose and chlorine and a substantially increased proportion of protein and calcium, as compared to the proportions of these materials present in said milk, the ratio of protein to lactose being in approximately reverse proportion to the proportions of these materials present in said milk, said material being characterized by dispersibility in water.

4. A pure dairy product useful in dietetics comprising a material derived from dialyzed milk and having, per unit weight of solids, a substantially decreased proportion of sodium, potassium, lactose and chlorine and a substantially increased proportion of protein and calcium, as compared to the proportions of these materials present in said milk, the ratio of protein to lactose being in approximately reverse proportion to the proportions of these materials present in said milk, said material being characterized by dispersibility in water.

5. A pure dairy product useful in dietetics comprising a material derived from dialyzed skim milk and having, per unit weight of solids, a substantially decreased proportion of sodium, potassium, lactose and chlorine and a substantially increased proportion of protein and calcium, as compared to the proportions of these materials present in said milk, the ratio of protein to lactose being in approximately reverse proportion to the proportions of these materials present in said milk, said material being characterized by dispersibility in water.

6. A pure dairy product useful in dietetics comprising a material derived from vacuum concentrated dialyzed skim milk and having, per unit weight of solids, a substantially decreased proportion of sodium, potassium and chlorine and a substantially increased proportion of protein and calcium, as compared to the proportions of these materials present in said milk, the ratio of protein to lactose being in approximately reverse proportion to the proportions of these materials present in said milk, said material being characterized by dispersibility in water.

FREDERICK K. DANIEL.

REFERENCES CITED

The following references are of record in the file of this patent:

UNITED STATES PATENTS

| Number | Name | Date |
|---|---|---|
| 1,022,523 | Whitney | Apr. 9, 1912 |
| 1,503,892 | Grindrod | Aug. 5, 1924 |
| 1,511,808 | Grindrod | Oct. 14, 1924 |
| 1,714,597 | Grindrod | May 28, 1929 |
| 2,437,080 | Daniel | Mar. 2, 1948 |

Certificate of Correction

Patent No. 2,542,633 February 20, 1951

FREDERICK K. DANIEL

It is hereby certified that error appears in the printed specification of the above numbered patent requiring correction as follows:

Column 6, line 37, for "potassium and" read *potassium, lactose and*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*